United States Patent [19]

Howard

[11] 4,219,850
[45] Aug. 26, 1980

[54] OPTICAL ENCODER

[75] Inventor: Robert C. Howard, Arcadia, Calif.

[73] Assignee: The Mead Corporation, Dayton, Ohio

[21] Appl. No.: 878,255

[22] Filed: Feb. 16, 1978

[51] Int. Cl.² .................. H04N 1/12; H04N 1/18
[52] U.S. Cl. ........................ 358/285; 358/212; 358/293
[58] Field of Search ........... 358/293, 294, 285, 212, 358/199, 205, 256, 206, 209, 109, 214, 215, 216, 54; 350/169, 172

[56] References Cited

U.S. PATENT DOCUMENTS

| | | | |
|---|---|---|---|
| 1,694,301 | 12/1928 | Alexanderson | 358/205 |
| 1,807,011 | 5/1931 | Ranger | 358/258 |
| 1,939,805 | 12/1933 | Dowsett | 358/206 |
| 2,098,236 | 11/1937 | Golay | 358/212 |
| 2,287,413 | 6/1942 | Bruce et al. | 358/288 |
| 2,953,638 | 9/1960 | Wintringham | 358/285 |
| 3,197,558 | 7/1965 | Ernst | 358/283 |
| 3,404,221 | 10/1968 | Loughren | 358/75 |
| 3,560,641 | 2/1971 | Taylor | 346/75 |
| 3,604,846 | 9/1971 | Beitang et al. | 358/298 |
| 3,913,719 | 10/1975 | Frey | 197/1 R |
| 3,928,718 | 12/1975 | Sagae et al. | 358/296 |
| 4,112,469 | 9/1978 | Paranjpe et al. | 358/293 |

FOREIGN PATENT DOCUMENTS 242956 1/1970 U.S.S.R. .

OTHER PUBLICATIONS

Janeway et al.–Multiple Diode Array Optics–IBM Tech Disclosure Bulletin–vol. 20, #1, Jun. 1977, pp. 18, 19.
Potak–Microfilm Scanning System–IBM Tech Disclosure Bulletin–vol. 17, #12, May 1975.

*Primary Examiner*—John C. Martin
*Assistant Examiner*—Joseph A. Orsino, Jr.
*Attorney, Agent, or Firm*—Biebel, French & Nauman

[57] ABSTRACT

An optical encoder for scanning a master image at scan points positioned in a plurality of parallel scan rows across the master image includes a means for illuminating the master image. A plurality of photoelectric scanning means, each such scanning means including a row of photoelectric transducers, provides electrical signals in dependence upon the amount of light striking the transducers. Light is directed from the master image by a focusing arrangement toward a first one of the photoelectric scanning means such that the first photoelectric scanning means receives light from an associated one of the scan rows on the master image. An optical diversion means includes one or more half silvered mirrors which divert a portion of the light directed toward the first photoelectric scanning means such that it strikes the others of the plurality of photoelectric scanning means whereby each of the scanning means receives light from an associated one of the plurality of scan rows on the master image.

2 Claims, 5 Drawing Figures

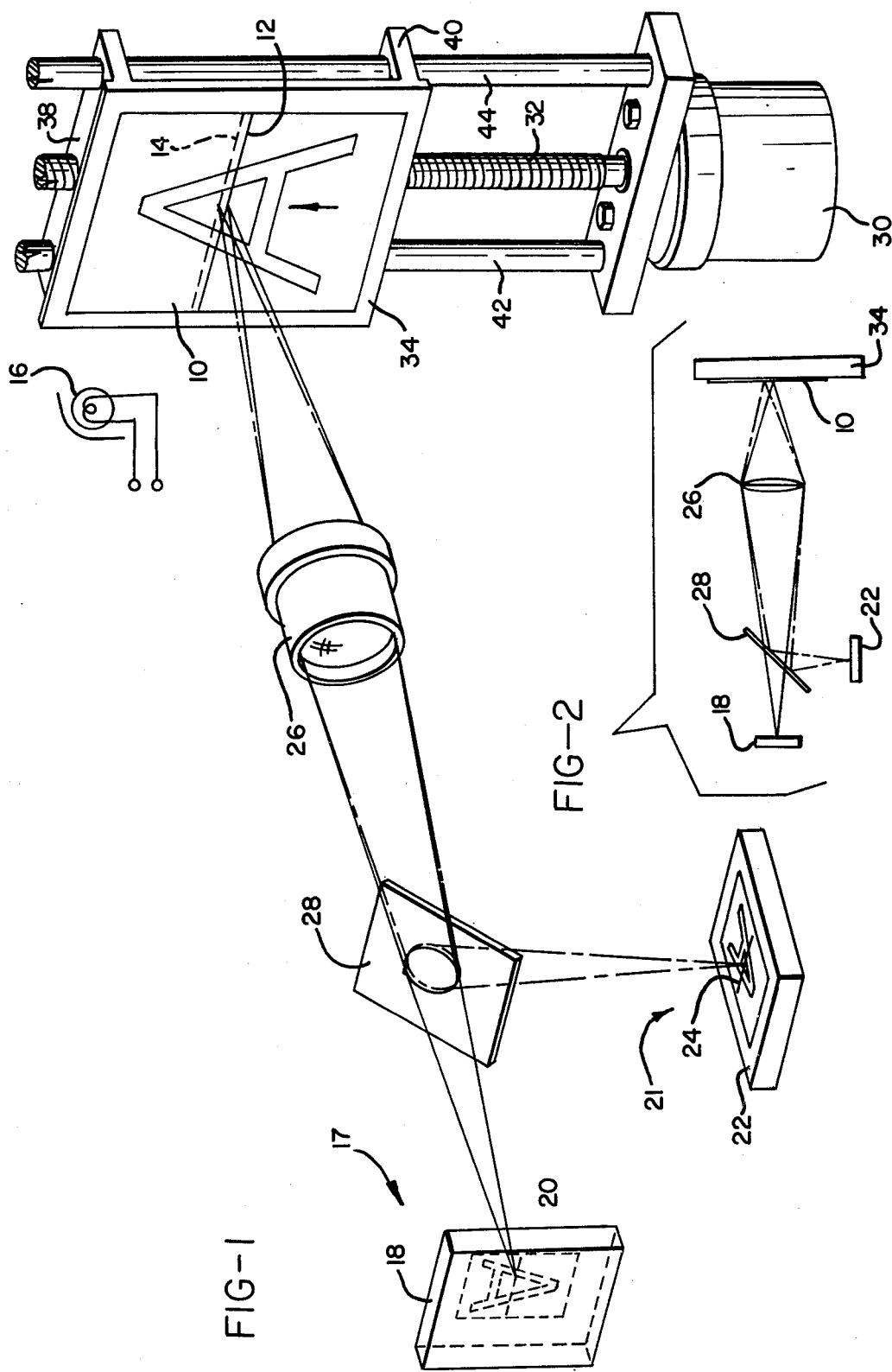

OPTICAL ENCODER

BACKGROUND OF THE INVENTION

The present invention relates to optical encoders and, more particularly, to encoders which may be used to provide print control information in a dot matrix copier such as an ink jet copier for copying all types of materials, including printed texts and photographs.

In order to utilize an ink jet printer as the printing mechanism for a copier, it is necessary to have some means of scanning the print density of the master image to produce print control information indicative of the pattern in which ink drops are deposited on the print medium. It is known in the prior art to illuminate the master image and then to direct light reflected from one or more rows of scan points on the image to a plurality of photoelectric transducers. The output signals from each transducer provides an indication of the print density of the master image at the associated scan point on a scan row. A large amount of light being reflected from a point on the master image will indicate a lighter toned area having little or no ink deposits.

An arrangement is provided for sweeping the rows of scan points across the master image. Electrical print control signals are thereby produced by the transducers which define the entire master image with sufficient resolution that a copy of the image may be printed by an ink jet printer.

The optical scanning arrangement for an encoder is usually determined, to a degree, by the jet printer configuration. In U.S. Pat. No. 3,604,846, issued Sept. 14, 1971, to Behane et al, an encoder is shown in which a single jet deposits drops upon a sheet of copy paper mounted on a rotating drum. The jet control circuit receives print information from an optical encoder in which a transparent master is scanned in a raster fashion. Relatively complicated data handling circuitry is required in the Behane et al device to convert the raster scan format into the proper data arrangement for use by the printer.

Another scanning arrangement is shown in U.S. Pat. No. 3,928,718, issued Dec. 23, 1975, to Sagae et al. In the Sagae et al device, the master is placed on a slowly rotating drum. The optical scanner is slowly moved axially along the rapidly rotating drum, thus scanning a plurality of points in parallel lines on the master image. A single jet printer is used in Sagae et al. A sheet of copy paper is mounted on a drum rotating at the same speed as the drum upon which the master image is mounted. The printer is moved axially along this drum in synchronism with the movement of the scanner. It is apparent that such an arrangement simplifies data timing and eliminates reordering of the data since the scanning and printing formats are identical and scanning and printing are accomplished simultaneously.

In order to provide images of sufficient resolution, it is necessary to deposit a large number of drops of ink on the print medium in precise registration. It will be appreciated that the speed at which printing is accomplished can be greatly increased by using a large number of jets positioned along a row which accomplishes printing in a single pass of the row of jets across the print medium. The minimum interjet spacing in an ink jet recorder is such that it may be difficult to position the jets as close together in a single row as would be desired for a given resolution, especially where the jets are operating in a binary fashion with each jet serving only a single row of print positions across the print medium. As seen in U.S. Pat. No. 3,913,719, issued Oct. 21, 1975, to Frey, one technique to overcome the limitation imposed by a minimum interjet spacing is position the jets in two parallel rows. The jets in the rows are staggered so that the ink drops deposited by the jets in the first row interlace with those deposited by jets in the second row. It will be appreciated that a data delay must necessarily be supplied in the data circuit providing print information to the second row in order to insure proper registration between the drops deposited by the two rows.

U.S. Pat. No. 3,560,641, issued Feb. 2, 1971, to Taylor et al discloses a printer in which plural tandem arrays of ink jet nozzles receive print information from a scanner having similarly positioned arrays of scanning elements. The master image is placed on a rotating drum and the arrays of scanning elements are positioned at predetermined locations around the drum periphery. While providing proper timing for the nozzle arrays, the Taylor et al scanner is somewhat cumbersome. Additionally, printers have been developed in which plural inclined rows of jets are used. This scanner does not lend itself readily to a configuration in which the rows of jet nozzles are positioned along lines which are inclined to the direction of print medium movement or in which a single row services plural inclined rows of print positions.

Accordingly, it is seen that there is a need for a simple, accurate scanning mechanism which provides print information for tandem rows of print positions serviced by an ink jet printer and which may be used with printers having drops which are deposited at print positions along lines which are inclined to the direction of print medium movement.

SUMMARY OF THE INVENTION

A scanner for providing electrical signals representative of the density of a master image at scan points positioned in a plurality of parallel scan rows across the master image, and a method of scanning, provide means for illuminating the master image. A plurality of photoelectric scanning means, each such photoelectric scanning means including a row of photoelectric transducers, provide electrical signals in dependence upon the amount of light striking the transducers. Optical focusing means is provided for directing light from the master image toward a first one of the photoelectric scanning means such that each of the photoelectric transducers in the first photoelectric scanning means receives light reflected from an associated scan point on the master image in an associated one of the plurality of parallel scan rows. A portion of the light directed by the optical focusing means toward the first one of the photoelectric scanning means is diverted by an optical diversion means to other ones of the plurality of photoelectric scanning means. Each of the photoelectric transducers in the photoelectric scanning means receives light from an associated scan point on the master image on a scan row associated with the photoelectric scanning means.

The scanner may further comprise means for altering the relative position of the optical focusing means with respect to the master image such that the plurality of rows of scan points are moved across the master image and master image scanned thereby. The optical diversion means may comprise a plurality of half silvered mirrors which are positioned between the optical focusing means and the photoelectric scanning means such that each of the photoelectric scanning means receives a substantially equal amount of light from the optical focusing means.

The rows of photoelectric transducers may be positioned such that the scan rows are moved across the master image in a direction substantially perpendicular to the scan rows. Alternatively, the photoelectric transducers in the photoelectric scanning means may be positioned such that the scan rows are moved across the master image in a direction which is oblique to the scan rows.

Accordingly, it is an object of the present invention to provide a method and a scanner for optically scanning a master image and for providing electrical signals in response to the print density of the master image at a plurality of scan points which are positioned along a plurality of scan lines; to provide such a scanner in which the scanned lines are moved across the master image, thereby scanning the entire image; and to provide such a scanner in which a half silvered mirror is used to divert a portion of the light directed toward one of the photoelectric scanning means to others of the photoelectric scanning means, whereby the master image may be scanned simultaneously by a plurality of photoelectric scanning means.

Other objects and advantages of the invention will be apparent from the following description, the accompanying drawings and the appended claims.

BRIEF DESCRIPTION OF THE DRAWINGS

FIG. 1 is a perspective view showing one embodiment of the present invention;

FIG. 2 is a side view of FIG. 1 illustrating the manner of operation of the invention of FIG. 1;

DETAILED DESCRIPTION OF THE PREFERRED EMBODIMENTS

Figures 3, 4:
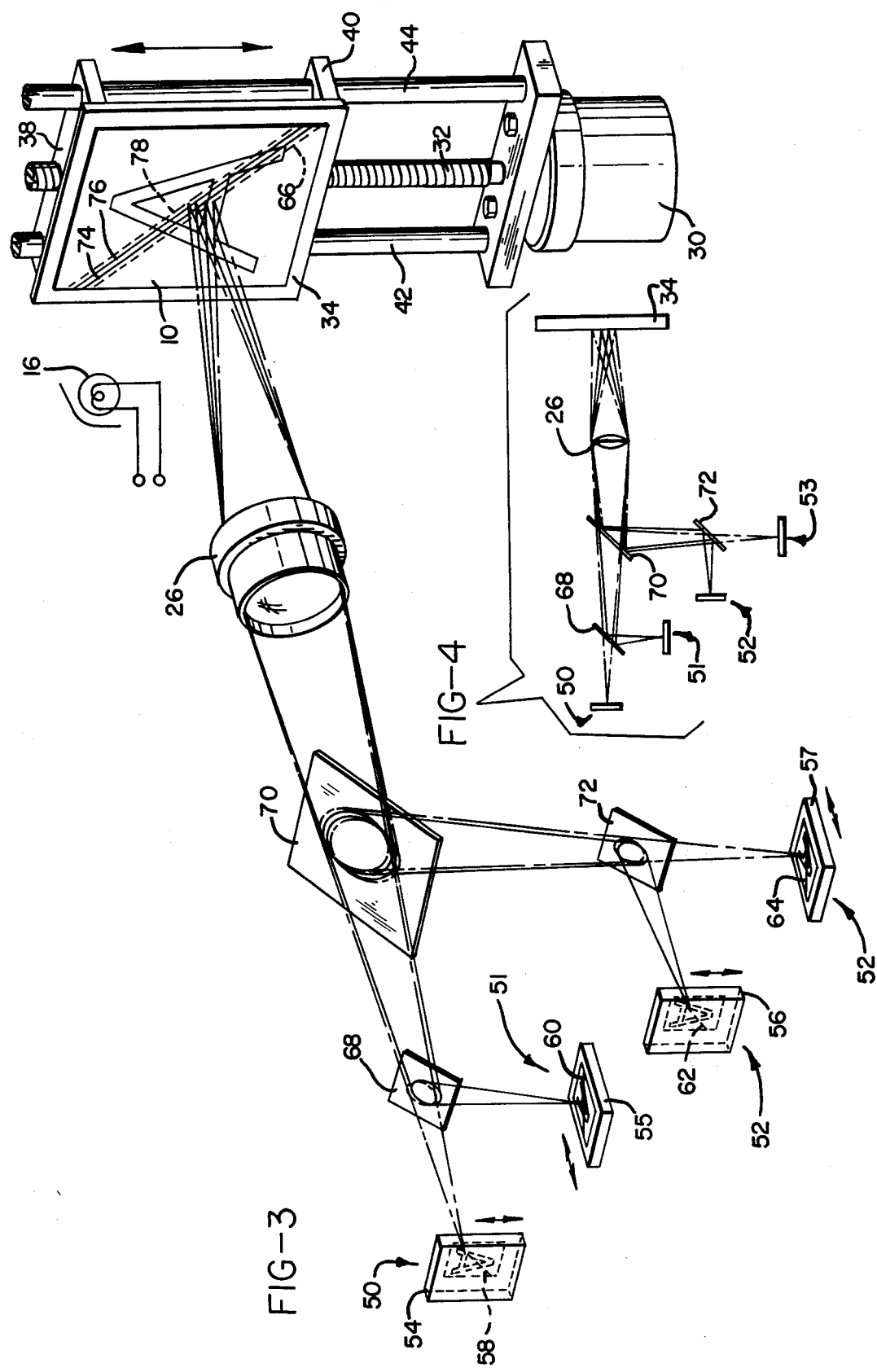
FIG. 3 is a perspective view of an alternative embodiment of the present invention.
FIG. 4 is a side view of the embodiment of FIG. 3, illustrating the operation of the device of FIG. 3.

Reference is now made to FIGS. 1 and 2, illustrating one embodiment of the present invention. A master image 10, schematically shown as the upper case letter "A", is to be scanned by the scanner of the present invention to determine the density of the master image at scanned points positioned in first and second parallel rows 12 and 14, respectively, on the image 10. The spacing between rows 14 and 12 may, for instance, correspond to the spacing between two rows of jets in an ink jet printer. In printers such as disclosed in Frey U.S. Pat. No. 3,913,719, above, the jets in the first and second rows will deposit drops along print lines on a print medium which will interlace to provide for printing across the entire width of the print medium. The scanner of the present invention may also be used advantageously in a printer having tandem rows of jets which do not interlace, but rather which deposit different color inks for multi-color printing. It is to be understood that the relative positions of the parallel scan rows 12 and 14 and the scan points in these rows are such as to correspond to the print positions in the printer to which the scan data is provided.

The master image 10 is illuminated by a light 16 which directs light at the master image 10 for reflection therefrom. It should be understood that the master image may also be in the form of a transparent or translucent image which is illuminated from the rear. The light which is detected in such an arrangement being that which passes through the master image, rather than that reflected from the master image.

A first photoelectric scanning means 17 includes a mounting plate 18 upon which are positioned a plurality of photoelectric transducers in a first transducer row, indicated generally at 20. The transducers in the first transducer row 20 provide electrical signals in response to the amount of light striking them. A second photoelectric scanning means 21 includes a mounting plate 22 upon which photoelectric transducers are positioned in a second transducer row 24. The transducers in row 24 also provide electrical signals in response to the light striking them.

An optical focusing means 26 directs the light from the master image 10 toward the first photoelectric scanning means 17 such that each of the photoelectric transducers in row 20 receives light from an associated scan point on the master image 10 in the first scan row 12. As shown in FIG. 1, the master image is projected by the optical focusing means 26 such that it is focused on the plane of the side of mounting plate 18 upon which the row of transducers 20 is mounted. Although shown as a simple convex lens in FIG. 2, it should be understood that the optical focusing means 26 may comprise a series of lenses.

An optical diversion means for diverting to the second photoelectric scanning means 21 a portion of the light directed by the optical focusing means 26 toward the first scanning photoelectric means 17 is provided such that each of the photoelectric transducers in row 24 receives light reflected from an associated scan point on the master image 10 in scan row 14. The optical diversion means comprises a half silvered mirror 28 which is positioned between the optical focusing means 26 and the first photoelectric scanning means. Substantially half the light directed towards the first photoelectric scanning means 17 by the focusing means 26 is reflected toward the second photoelectric scanning means 21 by the mirror 28.

The mirror 28 is arranged in such an orientation with respect to the row of transducers 24 that light from the scan row 14 falls upon the transducers in row 24. As seen in FIG. 1, the master image 10 is projected onto the plane of plate 22 such that the positioning of the row of transducers 24 on plate 22 determines the position of scan row 14 on the master image. A change in the angle of mirror 28 with respect to the light directed by focusing means 26 would result in a change in the portion of the image 10 scanned by the transducer row 24 and a corresponding change in position of the scan row 14.

In order to provide for scanning the entire master image 10, a means is provided for altering the relative position of the optical focusing means 26 with respect to the master image 10 such that the first and second rows of scan points 12 and 14 are moved across the master image. This means may include a motor 30 which rotates threaded shaft 32. The master image 10 is mounted on plate 34 including flanges 38 and 40 through which rods 42 and 44 extend. The openings in flanges 38 and 40 are sized such that the plate 34 may slide along rods 42 and 44 smoothly. Threaded shaft 32 extends through threaded openings in flanges 38 and 40 and moves plate 34 along rods 42 and 44 as motor 30 rotates. It is clear that, as the master image 10 is moved in the direction indicated, movement of the scan points in rows 12 and 14 occurs in a direction which is transverse to the scan rows 12 and 14.

It should be apparent that scanning of the master image may be accomplished in other ways. For instance, if it is desired to hold the master image fixed, the focusing means, diversion means, and photoelectric scanning means may be moved in unison with respect to the master image. Another approach is to fix all portions of the optical system, with the exception of the mounting plates 18 and 22 and to move these plates simultaneously such that the rows of photoelectric transducers 20 and 24 sweep across the projected image in the desired fashion.

Referring now to FIGS. 3 and 4, an alternative embodiment of the present invention is shown. The structure of the embodiment of FIGS. 3 and 4 is similar to that of FIGS. 1 and 2 and, accordingly, like elements have been indicated with the same numbers. A plurality of photoelectric scanning means are used in the embodiment of FIGS. 3 and 4. For the purposes of illustration, four such photoelectric scanning means 50, 51, 52, and 53 are shown but it will be appreciated that many more may be utilized if desired. Four mounting plates, 54, 55, 56, and 57 have mounted thereon rows of transducers indicated at 58, 60, 62, and 64, respectively. Each of the transducers in the rows 58, 60, 62 and 64, provides an electrical signal in dependence upon the amount of light striking it.

The optical focusing means 26 directs light from the master image 10 toward a first one of the electric scanning means 50 such that each of the photoelectric transducers in the row 58 receives light reflected from an associated scan point on the master image 10 in an associated one of a plurality of scan rows on the master. The transducers in the row 58 receive light from scan points on scan row 66.

The optical diversion means in the device of FIGS. 3 and 4 includes a plurality of half silvered mirrors 68, 70, and 72. These mirrors divert a portion of the light directed by the optical focusing means 26 toward the first photoelectric scanning means 50 such that each of the photoelectric transducers in rows 60, 62, and 64 receives light from an associated point on the master image 10 on a scan row which is associated with the respective photoelectric scanning means. Accordingly, the transducers in transducer row 60 receive light from scan points on scan row 74, the transducers in transducer row 62 receive light from scan points on scan row 76, and the transducers in transducer row 64 receive light from scan points on scan row 78. The scan rows defined upon the master image in FIG. 3, are shown as oblique to the direction of movement of the master image 10. The orientation of these rows is, of course, dependent upon the orientation of the rows of transducers 58, 60, 62, and 64. An arrangement including obliquely oriented scan rows is advantageous when used with an ink jet printer in which the print positions are similarly inclined with respect to the direction of print medium movement past the printer.

It should be noted that the half silvered mirror configuration in FIGS. 3 and 4 is arranged such that equal amounts of light are directed to each of the photoelectric scanners. It will be appreciated that the initial illumination required in the device of FIGS. 3 and 4 will necessarily be approximately twice that needed for the device of FIG. 1 to provide sufficient illumination to each of the rows of scanners.

Figure 5:
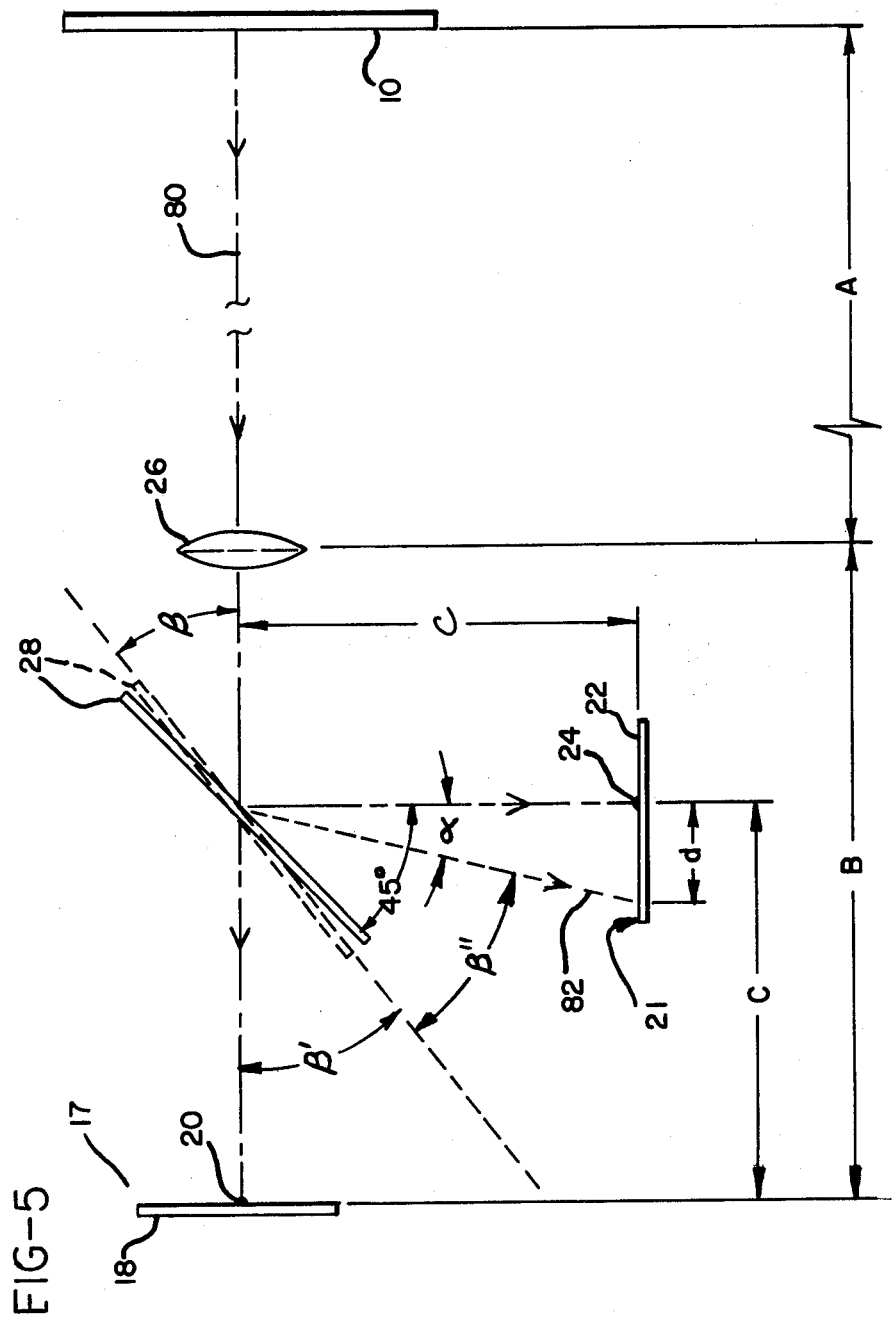
FIG. 5 is a view, similar to FIG. 1, illustrating the manner of operation of the invention in greater detail.

Reference is now made to FIG. 5, a view similar to FIG. 2, in which an optical diversion scheme is illustrated in greater detail. For the purposes of analysis the diversion of a single ray 80 from the master image 10 is shown, it being appreciated that light from the entire master image 10 will be diverted in like fashion. The optical focusing means 26 comprises a thin lens having a 50 mm. focal length. If the lens is positioned 12 cm. from the master image 10, the first photoelectric scanning means 17 will be positioned a distance B, determined by the following equation in order for the image 10 to be focused upon the transducer row 20.

$$1/A + 1/B = 1/F$$

where
F = focal length of the lens,
A = distance from the master image to the lens, and
B = distance from the lens to the projected focal plans.
Therefore, $$1/12 \text{ cm.} + 1/B = 1/5 \text{ cm.}$$

$$B = 8.571 \text{ cm.}$$

The half silvered mirror 28 is positioned 3.571 cm. from the lens 26. The distance C from each of the rows of transducers 20 and 24 to the mirror is therefore 5 cm.

The mirror orientation shown in solid lines is such that it is inclined 45° to the ray 80. With such an orientation the row of transducers 24 would receive light from precisely the same scan row on the master image 10 as the row of transducers 20. When the inclination of the mirror is increased as shown by the dashed lines such that it makes an angle B less than 45° with respect to ray 80, however, the ray 80 will be directed toward plate 22 along path 82 as shown. This will result in projection of the entire master image 10 being shifted on plate 22 by a distance d.

If it is desired to provide a displacement of 0.15 cm. between the scan rows on the master, the distance d is calculated by using the magnification formula for the lens 26, since the master image projected on plate 22 will be reduced by this factor.

$$0.15 \text{ cm.}/A = d/B$$

Since $A = 12$ cm. and $B = 8.571$ cm., $d = 0.107$ cm. The angle $\alpha$ by which the ray 80 is redirected equals $$\alpha = \tan^{-1} d/c = \tan^{-1}(0.107 \text{ cm.}/5 \text{ cm.})$$

$$\alpha = \tan^{-1}(0.0214)$$

$$\alpha = 1.22°$$

Since for a mirror the angle of incidence equals the angle of reflection, $B = B''$. Also, $B' = B$, since they are opposite included angles. Therefore $B = B' = B''$.

It is clear that $$\alpha + B' + B'' = 90°.$$

Therefore, $2B = 90° - 1.22°$, and $B = 44.39°$.

As discussed previously, this same result can be achieved in various ways. The mirror 28 may be inclined at a 45° angle with respect to ray 80, for instance, and the row of transducers shifted by a distance of 0.107 cm. on plate 22 in order to produce a displacement of scan rows on the master image of 0.15 cm.

While the method and forms of apparatus herein described constitute preferred embodiments of the invention, it is to be understood that the invention is not limited to these precise methods and forms of apparatus and that changes may be made therein without departing from the scope of the invention.

What is claimed is:

1. A scanner for providing simultaneously electrical signals representative of the density of a master image at scan points positioned in a first scan row on the image and for providing simultaneously electrical signals representative of the density of a master image at scan points positioned in a second scan row on the image, said second scan row extending substantially parallel to said first scan row, said first and second scan rows being spaced apart on the master image in a direction perpendicular to said scan rows, comprising:

means for illuminating said master image, a first photoelectric scanning means, including photoelectric transducers positioned in a first transducer row, for providing electrical signals in response to the amount of light striking said transducers, a second photoelectric scanning means, including photoelectric transducers positioned in a second transducer row, for providing electrical signals in response to the amount of light striking said transducers, optical focusing means for directing light from said master image toward said first photoelectric scanning means such that each of the photoelectric transducers in said first photoelectric scanning means receives light directed from an associated scan point on said master image in said first scan row, optical diversion means for diverting to said second photoelectric scanning means, a portion of the light directed by said optical focusing means toward said first photoelectric means such that each of the photoelectric transducers in said second photoelectric scanning means receives light reflected from an associated point on said master image in said second scan row, and means for altering the relative position of said optical focusing means with respect to said master image, said first and second photoelectric scanning means focusing means with respect to said master image results in movement of scan points in a direction which is oblique to said scan rows.

2. A scanner for providing simultaneously electrical signals representative of the density of a master image at scan points positioned in a plurality of parallel displaced scan rows across the image, said scan rows being spaced apart on the master image in a direction perpendicular to said scan rows, comprising:

means for illuminating said master image, a plurality of photoelectric scanning means, each such photoelectric scanning means including a row of photoelectric transducers, for providing electrical signals in dependence upon the amount of light striking said transducers, optical focusing means for directing light from said master image toward a first one of said photoelectric scanning means, such that each of the photoelectric transducers in said first photoelectric scanning means receives light reflected from an associated scan point on said master image in an associated one of said plurality of parallel scan rows, optical diversion means for diverting to ones of said plurality of photoelectric scanning means, other than said first one of said photoelectric scanning means, a portion of the light directed by said optical focusing means toward said first one of said photoelectric scanning means, such that each of the photoelectric transducers in a photoelectric scanning means to which light is diverted receives light directed from an associated point on said master image on a scan row associated with the photoelectric scanning means, said optical diversion means comprises a plurality of half-silvered mirrors positioned between said optical focusing means and said photoelectric scanning means such that each of said photoelectric scanning means receives a substantially equal amount of light from said optical focusing means, and means for altering the relative position of said optical focusing means with respect to said master image such that said scan rows are moved across said master image in a direction which is nonparallel with respect to said scan rows and said master image is thereby scanned, said rows of photoelectric transducers in said photoelectric scanning means being so positioned that said scan rows are moved across said master image in a direction oblique to said scan rows.

* * * * *

UNITED STATES PATENT AND TRADEMARK OFFICE
CERTIFICATE OF CORRECTION

PATENT NO. : 4,219,850
DATED : August 26, 1980
INVENTOR(S) : Robert C. Howard

It is certified that error appears in the above-identified patent and that said Letters Patent are hereby corrected as shown below:

Column 8, line 4, before "focusing" insert --being positioned such that the relative motion of said optical--.

Signed and Sealed this

Thirtieth Day of December 1980

[SEAL]

Attest:

SIDNEY A. DIAMOND

Attesting Officer

Commissioner of Patents and Trademarks